(12) United States Patent
Weh et al.

(10) Patent No.: US 7,740,286 B2
(45) Date of Patent: Jun. 22, 2010

(54) ROTARY TRANSMISSION LEADTHROUGH PROVIDED WITH A GAS RETURN LINE

(76) Inventors: Erwin Weh, Siemensstr. 5, 89257 Illertissen (DE); Wolfgang Weh, Siemensstr. 5, 89257 Illertissen (DE)

( * ) Notice: Subject to any disclaimer, the term of this patent is extended or adjusted under 35 U.S.C. 154(b) by 170 days.

(21) Appl. No.: 11/570,231

(22) PCT Filed: Jun. 7, 2005

(86) PCT No.: PCT/EP2005/006093
§ 371 (c)(1),
(2), (4) Date: Dec. 14, 2007

(87) PCT Pub. No.: WO2005/121626
PCT Pub. Date: Dec. 22, 2005

(65) Prior Publication Data
US 2008/0246275 A1 Oct. 9, 2008

(30) Foreign Application Priority Data
Jun. 7, 2004 (DE) .................. 20 2004 008 992 U

(51) Int. Cl.
F16L 39/00 (2006.01)
(52) U.S. Cl. .............................. 285/123.1; 285/123.12; 285/123.15; 285/148.1; 285/148.2; 285/148.21
(58) Field of Classification Search .............. 285/123.1, 285/123.3, 123.4, 123.12, 123.15, 148.1, 285/148.19, 148.21, 148.2, 924
See application file for complete search history.

(56) References Cited

U.S. PATENT DOCUMENTS

| 3,734,652 | A | | 5/1973 | Barnett |
| 3,980,112 | A | * | 9/1976 | Basham ...................... 141/392 |
| 4,142,742 | A | * | 3/1979 | Cornett et al. ........... 285/121.3 |
| 4,260,183 | A | | 4/1981 | Krupp et al. |
| 4,922,971 | A | * | 5/1990 | Grantham ...................... 141/1 |
| 5,203,384 | A | * | 4/1993 | Hansen ........................ 141/59 |
| 5,351,727 | A | | 10/1994 | Sanders et al. |
| 5,386,858 | A | | 2/1995 | Sanders et al. |
| 5,423,575 | A | * | 6/1995 | Parks ....................... 285/123.1 |
| 5,449,113 | A | * | 9/1995 | Bruckelmyer ............... 237/1 R |
| 5,904,376 | A | * | 5/1999 | Yuen ............................ 285/39 |
| 5,927,762 | A | * | 7/1999 | Webb .................... 285/123.15 |
| 5,931,184 | A | * | 8/1999 | Armenia et al. ............. 137/312 |
| 6,196,596 | B1 | * | 3/2001 | Kwok et al. ............. 285/123.1 |
| 6,682,102 | B1 | * | 1/2004 | Betz ....................... 285/123.15 |
| 6,866,299 | B2 | * | 3/2005 | Coates ................... 285/123.15 |
| 6,913,291 | B1 | * | 7/2005 | Betz ....................... 285/123.15 |
| 7,052,047 | B1 | * | 5/2006 | Box et al. .............. 285/123.15 |
| 7,427,084 | B1 | * | 9/2008 | Betz ....................... 285/123.15 |
| 2007/0241560 | A1 | * | 10/2007 | Malone ...................... 285/319 |

FOREIGN PATENT DOCUMENTS

WO WO 98/05898 2/1998

* cited by examiner

*Primary Examiner*—James M Hewitt
(74) *Attorney, Agent, or Firm*—Knobbe Martens Olson & Bear LLP

(57) ABSTRACT

A rotary transmission leadthrough is provided with a gas return line, in particular for filling a vehicle fuel tank comprising a rapid-action connection coupling, which is connected to the supply line and to a return line. The supply line and the return line are arranged in a coaxial manner in relation to each other.

8 Claims, 2 Drawing Sheets

ROTARY TRANSMISSION LEADTHROUGH PROVIDED WITH A GAS RETURN LINE

BACKGROUND OF THE INVENTION

1. Field of the Invention

The invention relates to a rotary transmission leadthrough with a gas return line, especially for filling a vehicle gas fuel tank, comprising a rapid-action connection coupling which is connected with a supply line and a return line, characterized in that the supply line and the return line are arranged in a coaxial manner in relation to each other.

2. Description of the Related Art

A secure and quick-connecting transmission of a fluid from a pressure source such as a natural-gas refueling installation to a vehicle is to be achieved with such rotary transmission leadthroughs. Especially important aspects in this respect are the simple and easy-to-use operation, so that even in the case of high refueling pressures of 200 bars and more easy handling is enabled, especially in connection with rapid-action connection couplings. The connection of such couplings may require a high amount of force in the case of large throughput cross sections (e.g. in the case of refueling buses) as a result of the twisting of the connecting hose. Moreover, the control lever can thus be brought to an unfavourable position during the insertion of the coupling, so that single-hand operation is hardly possible.

BRIEF SUMMARY OF THE INVENTION

In order to remedy such problems, a rotary transmission leadthrough in conjunction with a rapid-action connection coupling was described in WO 98/05898 of the applicant, with the rapid-action connection coupling comprising a housing with a fluid inlet and a fluid outlet and several valves in order to ensure secure sealing of the rapid-action connection coupling until the connection has been fully established. For compensating the twisting of the connecting hose a rotary transmission leadthrough was proposed which is integrated in the rapid-action connection coupling and also comprises a gas return via a second line. The lines proposed therein are relatively complex from a constructional viewpoint because respective connections such as union nuts and the like need to be provided on the rotary transmission leadthrough and on the hose side.

BRIEF SUMMARY OF THE INVENTION

The invention is therefore based on the object of providing a rotary transmission leadthrough with gas return line of the kind mentioned above, especially for use in a rapid-action connection coupling, which in combination with a simple configuration offers an especially compact design.

This object is achieved by a rotary transmission leadthrough with a gas return line comprising a rapid-action connection coupling which is connected with a supply line and a return line, characterized in that the supply line and the return line are arranged in a coaxial manner in relation to each other.

The proposed rotary transmission leadthrough with a gas return line is especially suitable for use with a rapid-action connection coupling for refueling with gas, with an especially simple and compact configuration being obtained because the return line is arranged in a coaxial manner to the supply line and thus only one hose is visible. When connecting or detaching the rapid-action connection coupling, mutual twisting of the connection hose and the gas return line is securely prevented, especially for the preferred embodiment of the invention for filling vehicle gas tanks.

Moreover, the screw joints of the supply line are advantageously within the return line and are thus securely encapsulated, so that in the event of any occurring leakages in the high-pressure screw joints or the supply line any gas leaking by diffusion can securely be removed within the return line. This is especially important for reasons of environmental protection because thus no gas volume is lost.

Moreover, handling is also facilitated because the supply line as well as the gas return line are uncoupled from each other in the direction of torsion, so that no excessive application of force is required. Notice must be taken that the proposed rotary transmission leadthrough is suitable for a large variety of couplings and connections. The rotary transmission leadthrough can also be arranged as a part for retrofitting, especially for long supply lines in the form of a separate component.

As a result of the rotary sleeve which is preferably integrated in the rapid-action connection coupling, complete rotational mobility of the rapid-action connection coupling is thus achieved relative to the supply line at any pressure level, so that twisting of the connection hose and the coaxial gas return line is avoided. The relative twistability of the two coaxial sleeves relative to each other is ensured, so that the rapid-action connection coupling can be connected without any major application of force.

BRIEF DESCRIPTION OF THE DRAWINGS

An embodiment of the invention is now explained and described in closer detail by reference to the enclosed drawings, wherein.

DETAILED DESCRIPTION OF THE INVENTION

Figure 1:
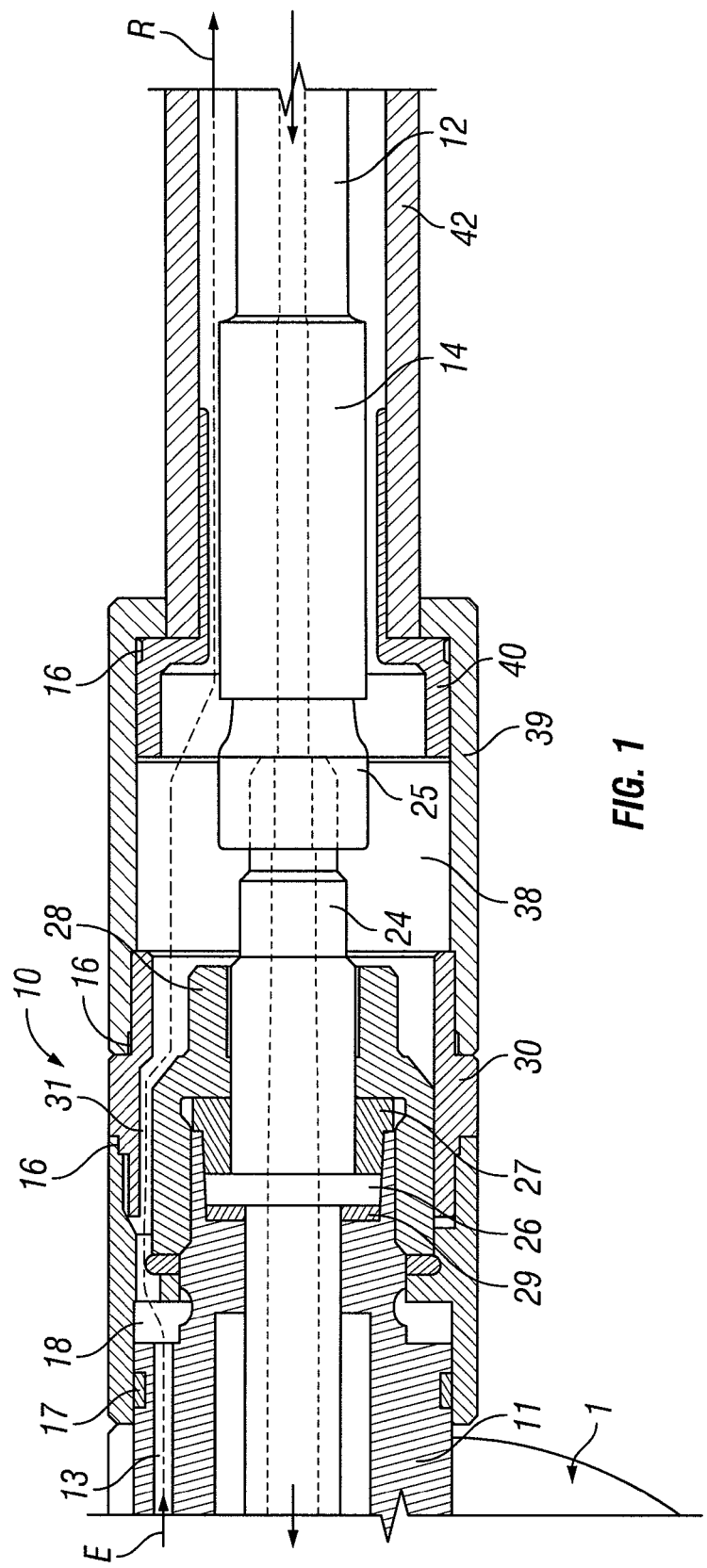
FIG. 1 shows a side view of a partially shown rapid-action connection coupling with an integrated rotary transmission leadthrough and a gas return line in a half-section.

FIG. 1 shows a preferred embodiment of a rotary transmission leadthrough 10 for use in combination with a rapid-action connection coupling 1 indicated on the left side here, which coupling can be coupled to a connection nipple (not shown). The rapid-action connection coupling 1 comprises a tubular housing 11 with a central fluid passage (see double arrow), with the supply of fluid occurring here from the right via a supply line 12 which is used for further conducting the fluid to be transferred to the left to the connection nipple. The supply line 12 comprises a connection adapter 14 which is pressed and/or screwed onto the hose end of the supply line 12. A high-pressure screw joint 25 is adjacent thereto, which joint leads to a rotary sleeve 24 and is sealed accordingly within the rotary transmission leadthrough 10. The tubular supply line 12, the connection adapter 14, the screw joint 25 and the rotary sleeve 24 inserted into the rotary transmission leadthrough 10 are arranged accordingly by being adapted to the respectively transmitted fluid, especially to the desired supply pressure values, leadthrough cross sections, etc.

Several grips (not shown) which are arranged in tubular form are provided in housing 11 and are used for insertion on the connection nipple in order to latch the rapid-action connection coupling 1 to the same. This arrangement is shown for example in the aforementioned WO 98/05898, so that a further description can be omitted. It merely needs to be mentioned that within the housing 11 a venting passage E in the form of an axial venting bore 13 is arranged within the housing 11, which venting passage leads to a vent valve and extends parallel to the central fluid passage (cf. double arrow) of the rapid-action connection coupling 1. An annular collar 26 is further provided on the rotary sleeve 24, which collar can be twisted relative to the housing 11 by means of a slide disk 29 and/or a roller bearing (cf. FIG. 2). A counter-sleeve 27 rests on the other face side of the annular collar 26 which is clamped with a union nut 28 against the housing 11. A ring 30 is provided around said union nut 28 which on its inside circumference comprises several axially extending slits 31.

When the vent valve is now opened for uncoupling, gas flows for pressure reduction along the vent passage E via the vent bore 13, an intermediate or compensating cavity 18, the said slits 31 and an annular cavity 38 to the right to the recirculation R, as is indicated with the dot-dash line. The annular cavity 38 is sealed like the entire vent passage E by gaskets 16 and 17 to the outside, so that the gas can only flow into the annular gap between the supply line 12 and the coaxial return line 42 to recirculation R (e.g. a filling station).

The return line 42 is held within the union nut 39 which seals the annular cavity 38 and comprises a connecting adapter 39 which is preferably arranged as a press fitting in order to ensure high tensile and tearing strength of the return line. As a result, relatively high gas pressures can be realized towards the recirculation side R. This is especially advantageous when the high-pressure screw joint 25 or the supply line 12 should have a leak. In this case, any optionally leaking gas can be removed within the return line 42 and cannot escape to the outside.

When fluid is supplied, the pressure can be applied to the face side of the rotary sleeve 24 or the slide disk 29 which face here to the left, so that a considerable axial force on the rotary sleeve 24 would be obtained in the case of high pressure values. For compensating purposes, a leadthrough (not shown) from the compensating cavity 18 is provided here within the rotary leadthrough 10, preferably in the form of an oblique or radial bore, so that the rotary sleeve 24 remains substantially free from axial forces and thus easy to twist.

As mentioned above, the vent valve is opened during the uncoupling of the rapid-action connection coupling 1. As a result, any still applying pressure medium flows via the vent bore 13 which is aligned parallel to the central fluid passage in the housing 11 or the rotary leadthrough 10 and the slots 31 (or similar bores) and the annular cavity to the return line 42. The annular cavity 38 is sealed by gaskets 16 in the corner region for example between the connecting adapter 40 and the union nut 39. The rotary sleeve 24 connected to the supply line 12 can be twisted relative to each other like the return line 42 and is connected relative to the stationary housing 11 in a twistable manner within the rotary leadthrough 10, so that the return line 42 and the fluid line 12 extending parallel thereto cannot twist with each other.

Notice must be taken that the rotary transmission 10 which is integrated here in the rapid-action connection coupling 1 can also be arranged as a separate component, especially a part for retrofitting existing couplings. In this case, the rotary leadthrough 10 for the two lines 12 and 42 extending coaxially relative to each other would end approximately along the compensating cavity 18, with the housing 11 situated opposite of the rotary sleeve 24 then being provided with a separate line connection.

Figure 2:
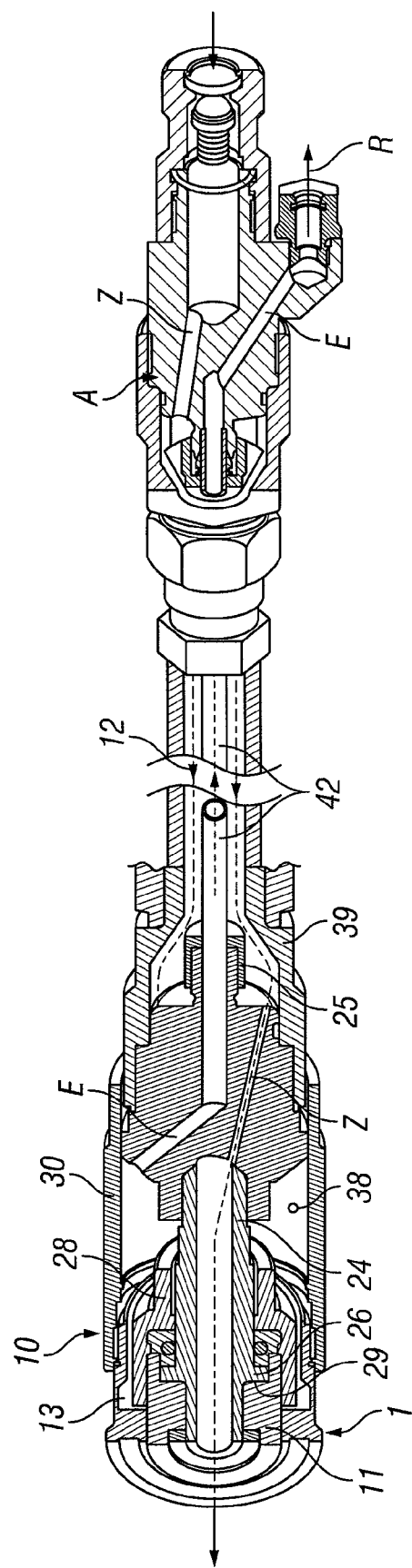
FIG. 2 shows a modified embodiment of the supply line.

As already mentioned above, relatively high pressure values can be realized in the return line 42, so that the modified arrangement according to FIG. 2 is also possible, i.e. the two lines 12 and 42 extending coaxially relative to each other can be used in a reverse manner in their direction of flow. In this case, the return conduction of the vented medium occurs towards the recirculation side R via the central line 42, whereas the supply from the filling side which is to the right in this case occurs via an oblique bore Z in the supply line 12 which is arranged here in an annular manner about the line 42. The pressure medium is guided from there again via an oblique bore Z to the central fluid passage in the region of the rotary sleeve 24 in order to open into the connection coupling 1 according to the double arrow in FIG. 1. Components with the same function are provided with identical reference numerals as in FIG. 1.

Venting occurs in FIG. 2 as in FIG. 1 via vent bores 13 and an annular cavity 38 around the rotary sleeve 24. In this region of the rotary leadthrough 19, i.e. within the ring 30, an oblique bore E is provided which guides the vented medium into the central return line 42. At the severing point indicated here between the right and left half of the high-pressure hose, the direction of the flow of the medium is indicated with arrows. Such a high-pressure hose can have a length of several meters. At the right side here (filling station side), an adapter A is attached, with the return line 42 leading again via a (second) oblique bore E in adapter A to the recirculation side R. Notice must be taken that a similar adapter A can also be attached to the right hose end of the coaxial lines 12 and 42 of the embodiment in FIG. 1. The outer covering hose is thus used in both embodiments also for the protection of the coaxial central line. The annular cavity around the central line can be used either for supplying as well as for removing in a controlled manner the gases on the recirculation connection R of adapter A.

The invention claimed is:

1. A rotary transmission leadthrough with a gas return line, the rotary transmission leadthrough being configured for filling a vehicle gas fuel tank, the rotary transmission leadthrough comprising:
    a supply line and a return line arranged in a coaxial manner in relation to each other, the supply line comprising a first connection adapter, the return line comprising a second connection adapter, the first and second connection adapters being arranged coaxially in relation to each other;
    a rapid-action connection coupling connected to the supply line and the return line, the rapid-action connection coupling comprising a housing;
    a rotary sleeve having an annular collar, a first union nut enclosing an outwardly sealed annular cavity, a second union nut clamping a counter-sleeve to the annular collar, a ring provided around the second union nut, and a plurality of axially-extending slits between the ring and the second union nut,
    wherein the rotary sleeve is rotatably connected with the housing and opens into the annular cavity, wherein the first and second connection adapters are arranged within the first union nut, and wherein the ring is rotatably held on the second union nut.

2. A rotary transmission leadthrough according to claim 1, wherein the annular collar is rotatable relative to the housing.

3. A rotary transmission leadthrough according to claim 1, wherein the slits are provided on an inner circumference of the ring.

4. A rotary transmission leadthrough according to claim 1, wherein the slits are opposite of a vent bore in the housing.

5. A rotary transmission leadthrough according to claim 1, wherein that the annular cavity is sealed towards the outside by means of gaskets.

6. A rotary transmission leadthrough according to claim 1, wherein the rotary sleeve is arranged in an inlet region of the rapid-action connection coupling.

7. A rotary transmission leadthrough according to claim 1, wherein the return line is arranged centrally within the supply line.

8. A rotary transmission leadthrough according to claim 7, wherein at least one oblique bore leads radially outward from the central return line.

* * * * *

UNITED STATES PATENT AND TRADEMARK OFFICE
CERTIFICATE OF CORRECTION

| | |
|---|---|
| PATENT NO. | : 7,740,286 B2 |
| APPLICATION NO. | : 11/570231 |
| DATED | : June 22, 2010 |
| INVENTOR(S) | : Weh et al. |

Page 1 of 1

It is certified that error appears in the above-identified patent and that said Letters Patent is hereby corrected as shown below:

In Column 3, Line 23, please delete "adapter 39" and insert --adapter 40--.

In Column 5, Line 4, in Claim 5, after "wherein", please delete "that".

Signed and Sealed this

Twenty-third Day of November, 2010

David J. Kappos
*Director of the United States Patent and Trademark Office*